United States Patent [19]
Riedl

[11] Patent Number: 5,928,788
[45] Date of Patent: Jul. 27, 1999

[54] DATA CARRIER WITH LAYERS OF MODIFIED PET

[75] Inventor: Josef Riedl, Attenkirchen, Germany

[73] Assignee: Giesecke & Devrient GmbH, Germany

[21] Appl. No.: 08/652,459

[22] PCT Filed: Oct. 17, 1995

[86] PCT No.: PCT/EP95/04071

§ 371 Date: Sep. 11, 1996

§ 102(e) Date: Sep. 11, 1996

[87] PCT Pub. No.: WO96/11805

PCT Pub. Date: Apr. 25, 1996

[30] Foreign Application Priority Data

Oct. 18, 1994 [DE] Germany ............ P 44 37 263
Mar. 1, 1995 [DE] Germany ............ 195 07 144

[51] Int. Cl.[6] .................................................. B32B 9/00
[52] U.S. Cl. ............ 428/411.1; 428/41.8; 428/195; 428/323; 428/337; 428/405; 428/500; 428/688; 156/219; 156/220; 156/269
[58] Field of Search ................. 428/411.1, 688, 428/500, 405, 41.8; 156/219, 220, 269

[56] References Cited

U.S. PATENT DOCUMENTS

| 4,370,293 | 1/1983 | Petersen-Hoj ............ 264/514 |
| 4,522,670 | 6/1985 | Caines ...................... 156/220 |
| 5,187,496 | 2/1993 | Yu ............................ 346/135.1 |

FOREIGN PATENT DOCUMENTS

| 0 385 611 | 9/1990 | European Pat. Off. . |
| 1 465 973 | 3/1977 | United Kingdom . |

OTHER PUBLICATIONS

Database WPI, Section Ch, Week 9425, Derwent Publications Ltd., London, GB,; Class A32, AN 94–205789.

Primary Examiner—Deborah Jones
Assistant Examiner—Abraham Bahta
Attorney, Agent, or Firm—Bacon & Thomas, PLLC

[57] ABSTRACT

The invention relates to a single- or multilayer data carrier, such as an identity card, bank card or the like. The data carrier has at least one plastic layer, this plastic layer consisting of a thermally nonrecrystallizing polyester.

39 Claims, 2 Drawing Sheets

DATA CARRIER WITH LAYERS OF MODIFIED PET

The invention relates to a single- or multilayer data carrier, such as an identity card, bank card or the like, which has at least one plastic layer.

Data carriers like identity cards, credit cards, bank cards, passport personalization pages, telephone cards and the like have attained great significance in daily life and will continue to grow in importance. Their spread and the number of cards in circulation have risen steeply in recent years. High-grade cards, which are used for example in the security area or in areas requiring high mechanical resistance, are usually made of several layers. A core layer printed on one or both sides is chiefly covered by two transparent cover layers.

BACKGROUND OF THE INVENTION

Of card materials to be selected for use, in particular PVC has proven useful. DE 30 48 736 A1 discloses for example a single-layer identity card of PVC dyed white with titanium dioxide. However, PVC is also preferably used in cards which consist of several layers. This material can be processed into foils which offer considerable advantages over other foil materials as the starting material for the individual layers. The individual layers can thus be laminated, i.e. interconnected under pressure and heat. Additives which influence or determine certain properties of the PVC foil can be incorporated very well in the material. For example one can produce both transparent layers and opaque layers. Furthermore this plastic can be mixed with pigments and other usual additives so that the material properties can be adjusted within wide limits, e.g. color, radiation absorption behavior and the like.

Multilayer identity cards of PVC have also been proposed which consist for example of a printed opaque card core and two transparent cover foils (DE 30 29 939 A1). Since all layers consist of the same plastic material they can be connected into a card laminate in a simple way.

However, PVC itself has the decisive drawback in terms of environmental acceptability that it can hardly be recycled. Disposal of the plastic furthermore causes considerable difficulties since hydrochloric acid arises during combustion and ultimate disposal of PVC. Furthermore PVC readily becomes brittle at low temperatures so that the card breaks easily.

To improve the mechanical properties and temperature stability of PVC cards, on the one hand, and reduce the quantity of PVC used, on the other, one has proposed producing high-grade cards from several layers of different materials.

EP 430 282 A2 thus discloses a card wherein the PVC cover layers and the PVC core layer of the card are each separated by a layer of thermoplastic polyurethane (TPU) so that the mechanical properties are improved. The PVC layers in such cards can also be replaced by other plastics, such as polyethylene or polycarbonate, without adversely affecting the mechanical properties of the card.

A drawback of such multilayer cards, however, is that the different plastics in the card compound can hardly be separated again on a large scale for recycling processes. At the end of the service life of the card only the crushed card laminate, i.e. a mixture of the plastics used, can be further treated in the recycling process, so that the card compound can only be processed into inferior plastic articles which cannot meet any high requirements with regard to color and mechanical properties.

SUMMARY OF THE INVENTION

The problem of the invention is to propose a data carrier, and a method for producing it, which has favorable mechanical, optical and thermal properties while being readily recyclable and disposable in environmentally acceptable fashion.

This problem is solved by the features stated in the main claim.

The basic idea of the invention is to use a thermally nonrecrystallizing polyester instead of the PVC used up to now for data carriers. This material is characterized by not losing its transparency during thermal processing, on the one hand, and easily being dyed by the addition of dyes or pigments, on the other. Single- or multilayer data carriers of thermally nonrecrystallizing polyester therefore guarantee the familiar outer appearance of the data carrier and additionally its environment-friendly ultimate disposal or recyclability. Furthermore the inventive data carriers have improved mechanical properties over conventional data carriers containing PVC.

A further advantage of the inventive solution is the saving of energy which can be obtained by a lower processing temperature. This furthermore permits a reduction of production cycle times.

If the data carrier is to be produced using a process in which the thermally nonrecrystallizing polyesters are subjected to a thermal molding or pressing process, for example injection molding or lamination, the thermally nonrecrystallizing polyesters can stick to the heated molding or pressing plates so that no smooth surfaces can be produced or the thermal molding process fails completely.

To prevent this one can provide the heated molding or pressing parts with antistick agents. However this procedure involves the disadvantage for the production of data carriers that the molding or pressing plates must constantly be cleaned and the coating renewed. Furthermore, part of the antistick agent deposits in high concentration on the surface of the data carrier so that an additional, undesirable layer arises on the surface of the data carrier and impairs printing, lacquering and the application of additional elements.

In a development of the invention one therefore provides at least the thermally nonrecrystallizing polyester used for the cover layers of the data carrier with an additive, a so-called antiblocking agent, so as to prevent adhesion of the thermally nonrecrystallizing polyester to the casting, injection or laminating molds.

For producing card-shaped data carriers it is suitable to use, from the group of thermally nonrecrystallizing polyesters, in particular chemically modified polyethylene terephthalate (PET) whose structure is modified for example with glycol and cyclohexane dimethanol (CHDM) so as to exclude thermal crystallization of the PET. Such materials can be produced for example by adding, during synthesis of the PET, glycol and CHDM which are inserted in the main chain of the PET giving rise to thermally nonrecrystallizing PETG.

In a first embodiment the inventive data carrier consists of three thermally nonrecrystallizing PETG foils modified with glycol and CHDM. The PETG used for the core layer is modified additionally by added pigments so that the foil produced therefrom is opaque and has the desired ground color. One can use $TiO_2$ here, for example, which leads to a white coloring of the core layer. This core layer can be printed on one or both sides. The top and underside of the core layer are each covered with a transparent PETG foil in which small amounts of an antiblocking agent are mixed. The layers are laminated at a temperature of 100° C. This causes the transparent cover layers to connect firmly with the core layer, whereby the antiblocking agent contained in the cover layers prevents the card from sticking to the laminating plates. One obtains a card protected from outside by two transparent cover layers. If data are to be incorporated in one or both cover layers afterwards with the help of a laser beam, the PETG foil to be inscribed must be additionally provided with a laser-sensitizing substance. It has turned out to be especially advantageous to provide the transparent cover foil with carbon black. The concentration of sensitizing substance is to be selected so that a flawless inscription can be produced, on the one hand, but the transparency of the foil is not impaired, on the other.

Further advantages and advantageous developments will be explained with reference to the following figures, which for the sake of clearness are not true to size.

DESCRIPTION OF THE PREFERRED EMBODIMENTS

Figure 1:
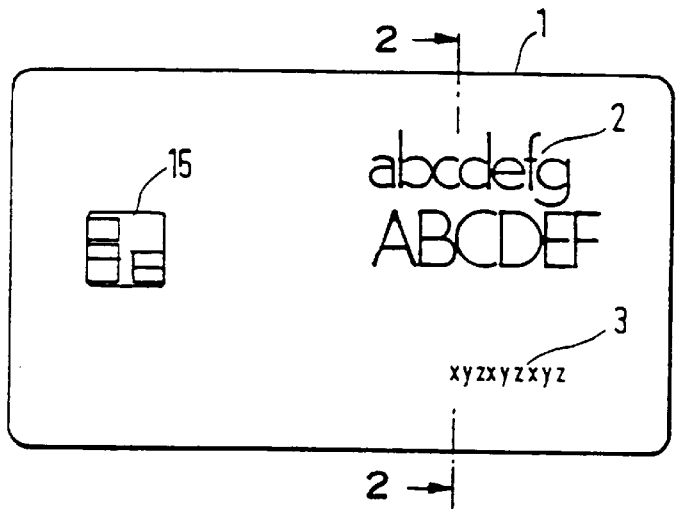
FIG. 1 an inventive identity card.

FIG. 1 shows an inventive data carrier in the form of a card with print 2 visible from the front and/or back of the card, and data 3 incorporated with a laser. The data carrier can optionally be equipped with integrated circuit 15 and have further elements such as a signature stripe, magnetic stripe or optical data recording areas.

Figure 2:
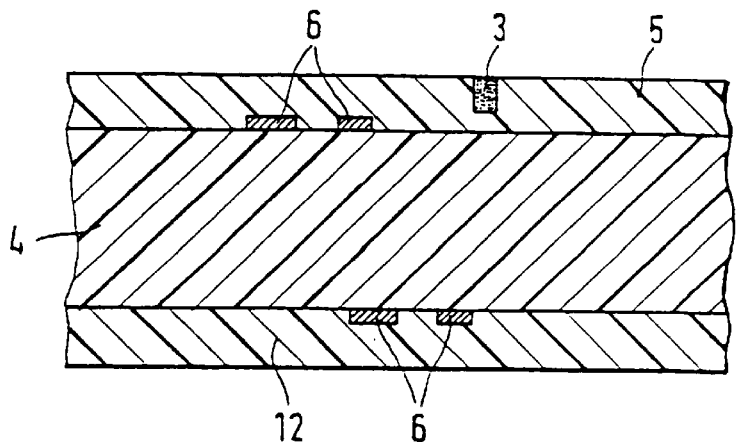
FIG. 2 the cross section of the identity card along sectional line A-B.

FIG. 2 shows the cross section through a first embodiment of the card along sectional line A-B. The card consists of opaque card core 4 as well as two transparent cover layers 5 and 12 covering the card core. Core layer 4 bears printed image data 6 which are present on the front and/or back of the core layer.

After the card is completed laser data 3 are incorporated additionally in cover layer 5. Core layer 4 and cover layers 5 and 12 of the card consist of modified, thermally nonrecrystallizing polyester, for example a thermally nonrecrystallizing polyethylene terephthalate (PETG) during the production of which the main chain was modified with glycol and CHDM. Such special polyesters are characterized by forming no crystallites and thus remaining transparent after being heated above the melting point and subsequently cooled, regardless of the cooling rate.

Obviously other designs can also be used for producing the inventive card, such as a completely or partly transparent core layer, translucent cover layers, and cover layers opaque only in partial areas. The card core can likewise be printed only on one side. The laser data can be incorporated in one or both cover layers or also in the core layer if it is accordingly sensitized.

The necessary additives, such as pigments, radiation absorbent substances and the like which give the finished card the desired basic outer appearance and its basic properties, are already added during production of the core and cover foils.

For producing the card one first produces the foils with the particular necessary properties. The thickness of the foils is selected so that the total thickness of the card laminate reaches the desired layer thickness of the card. For cards, the core layer foil is preferably produced in a thickness of 200 to 650 microns and the cover layer foil in a thickness of 50 to 300 microns. To improve the adhesion of the cover foils to the core layer one can roll the cover foils directly after their production, the surface being enlarged by roughening. The core layer foil is subsequently printed endlessly, in sheet form or in the form of single cards. After being printed the core layer foil is covered on both sides with transparent PETG foils to which antiblocking agents are added. As antiblocking agents one can use in particular hydrocarbons such as paraffins or polyethylene wax, fatty alcohols, for example stearyl alcohol, higher carboxylic acids or metallic salts, such as montanic acid, calcium stearate, zinc stearate, calcium montanate, or montan waxes such as montanic acid ester wax or partly saponified montanic acid ester wax.

As for the quantity of antiblocking agents added, one must make sure enough antiblocking agent is added to guarantee sufficient detachability from the laminating plates, on the one hand, while the quantity of antiblocking agents does not prevent interconnection of the layers during lamination, on the other. For a PETG card laminate it has proved favorable to use a proportion of 0.1 to 3% based on the weight of the polymer, depending on the antiblocking agent used. It has proved especially advantageous to select the quantity of antiblocking agent between 0.5 and 2 wt %.

One can provide further additives in the PETO foils used for the cover layer to permit inscription with a laser beam for example. One can use in particular carbon black, graphite or other substances absorbing the energy of the particular laser beam used. As for the quantity of all substances added, however, one must make sure the desired transparency property of the PETG cover foil is not adversely affected so as to guarantee recognizability of the print located on the core layer. However, the use of cover layers which are translucent or opaque only in partial areas opens up interesting design possibilities. It is furthermore possible to make one of the cover layers opaque, preferably the back card layer.

Furthermore it is possible to improve the properties of the PETG card with regard to the application or incorporation of data using a laser by providing further additives. One can add in particular fast and sensitively carbonizing plastics, i.e. essentially polycarbonate. These plastics are compounded before being mixed in, i.e. a master batch is produced on the basis of the thermally nonrecrystallizing polyester with the additives in corresponding concentration, and added to the PETG. With the help of these additives one can considerably improve the production of halftone images, i.e. in particular the production of photos or other gray level images. Depending on the application the expert is also free to use a combination of different laser-sensitive additives in order to create optimal conditions for the particular application.

By providing other additives one can further influence the properties of the PETG card positively. For example one can improve the temperature stability of the card by adding substances selected from the group of polyethylene naphthalates deriving from polyester. One can fundamentally adjust any temperature stability up to about 100° C. via the concentration of admixed additives. One selects concentrations which are in a range of 5 to 45%, in particular 10 to 25%. The admixture of such additives simultaneously causes an improvement in impact resistance, which has a positive effect in particular when the card is to be embossed.

Figure 3:
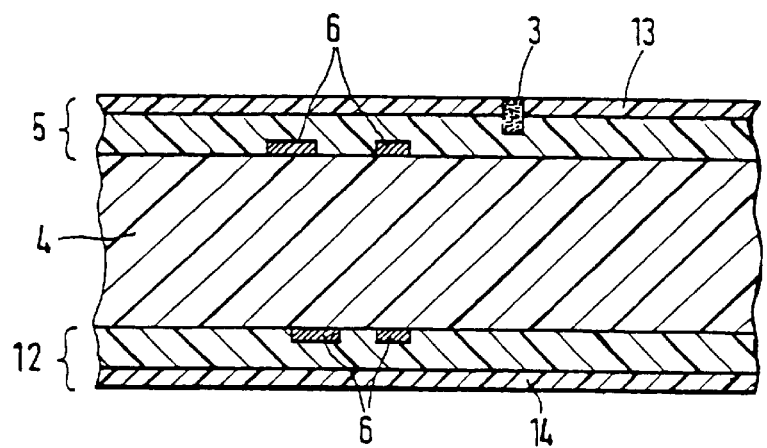
FIG. 3 the cross section through a modified inventive data carrier.

FIG. 3 shows a further possible layer structure of the card in cross section. Card core layer 4 printed on one or both sides is again made of an opaque PETG foil and is covered on both sides by transparent PETG layers 5 and 12. To guarantee good detachability from the laminating plates, layers 5 and 12 are produced in such a way that only volume areas 13 and 14 located directly under the outer surface of layers 5 and 12 are enriched with antiblocking agents. This embodiment has the advantage that much less antiblocking agent need be mixed into the PETG while detachment of the card from the laminating plates is nevertheless guaranteed.

Figure 4:
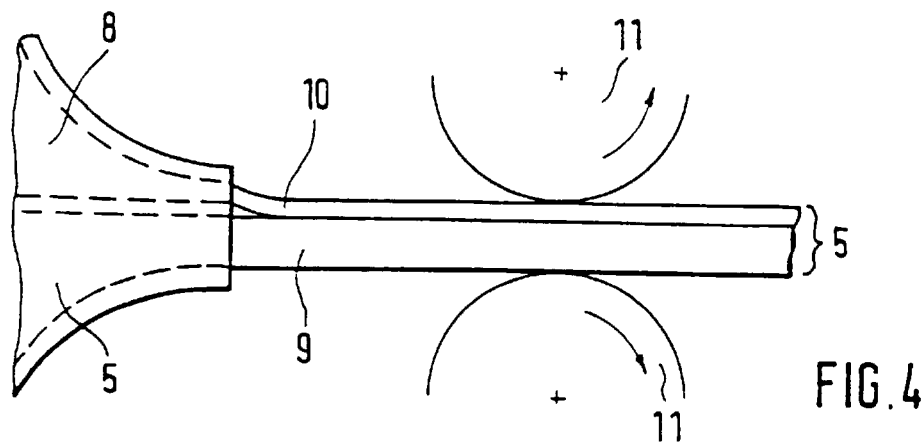
FIG. 4 the principle of coextruding a foil web in a side view.

As schematically shown in FIG. 4 in a side view, one can produce cover layers 5 and 12 described in FIG. 3 for example by coextruding a PETG foil without antiblocking agents 9 together with a PETG foil with antiblocking agents 10 from two different nozzles 7, 8 of an extruder. The layer thicknesses of these two foils can be adjusted separately, whereby the desired total layer thickness of a cover foil 5, 12 can be adjusted from about 50 to 200 microns. The layer thickness proportion of the PETG foil with antiblocking agent to the layer thickness of the PETG without antiblocking agent is preferably between 1:1 and 1:5, i.e. the layer thickness of the PETG foil with antiblocking agent is preferably in the range of 10 to 100 microns.

For this purpose the PETG without antiblocking agent is extruded from extruder nozzle 7 and thereabove a thin layer of PETG with antiblocking agent from extruder nozzle 8. The PETG web without antiblocking agent 9 then runs with a PETG web with antiblocking agent 10 applied thereto toward pair of rolls 11 which interconnects the two foils so as to give rise to cover foil 5, 12 which is enriched with antiblocking agents in its surface area.

For producing the PETG web enriched with antiblocking agents in its surface area it is also possible, however, to coat a PETG web without antiblocking agents with a PETG web with antiblocking agents. This is of great advantage in particular when the coating thickness is to be between 1 and 20 microns. Of the two methods outlined for producing the cover foils one selects the one which best achieves the desired thicknesses of PETG with antiblocking agent.

Figure 5:
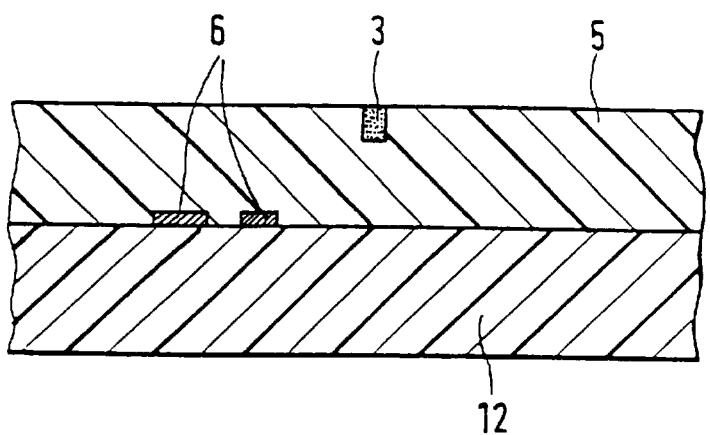
FIG. 5 the cross section through a further modified inventive data carrier.

FIG. 5 shows a cross section through a further embodiment of the inventive data carrier. The data carrier consists in this case only of two cover foils which were made from PETG and provided with an antiblocking agent at least in partial areas of their volume. These foils are laminated together and preferably have equal thickness. For incorporating printed image data one provides the inner surface of lower foil 12 with printed image 6 before lamination. Layer 12 itself is opaque. The printed image can then be viewed through transparent second layer 5. After the data carrier is completed laser data 3 can furthermore be written into layer 5.

Especially interesting variants can be produced if layer 12 is not opaque but also transparent at least in partial areas. In this case one obtains a data carrier which is completely transparent in the unprinted places and has so-called see-through windows in almost any geometric shape. The printed image data can of course also be applied to the inner surface of layer 5 before lamination. Furthermore laser data 3 can be incorporated in layer 12 both additionally and exclusively if this layer is also sensitized to laser radiation.

In a further embodiment it is possible to add to layer 5 and/or 12 only enough dyes or pigments to make the layers translucent, i.e. the printed image data are recognizable through layer 12 but superimposed with the color of layer 5. If different color tones are selected for layers 12 and 5 and the card is translucent from both sides, the printed image can be viewed from the front and back, the printed image then being superimposed by a different color tone in each case.

An embodiment of the inventive data carrier and the method for producing it will be explained by way of the following example.

An opaque white core layer foil of PETG is produced, 10 parts of TiO per 90 parts of PETG being admixed and distributed homogeneously in the melt. Subsequently a 630 micron thick foil is drawn for use as the core layer foil. To produce the cover foils one mixes 98.5 parts of transparent PETG with 1.5 parts of amide wax and produces a cover foil in a thickness of 100 microns. The core layer is printed and subsequently laminated to the transparent cover layers at 1000° C. resulting in a card with a total thickness of 830 microns.

Figure 6:
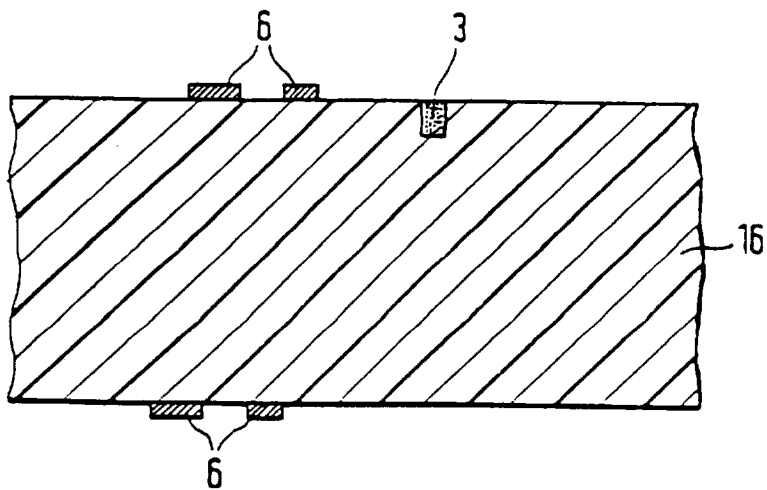

For applications where security is less relevant the inventive data carrier can also be produced of a single layer, i.e. have only one layer of a thermally nonrecrystallizing polyester. FIG. 6 shows schematically a cross section through such a card. The card consists for example completely of PETG layer 16, which is preferably opaque. In this embodiment too, printed image data 6 can be printed on the card surface. If the thermally nonrecrystallizing polyester was provided with a laser-sensitizing substance, laser data 3 can furthermore be incorporated inside the card, but they must be located in the unprinted parts of the card at least when the ink of print 6 is not transparent to laser radiation. Such a card can be produced for example by already producing the foil from thermally nonrecrystallizing polyester in the desired card layer thickness, color and with the other desired properties. The foil can subsequently be punched out into sheets or single cards and the punched elements then printed.

A further possibility of producing such single-layer cards is to put the preferably opaque, thermally nonrecrystallizing polyester in the form of the data carrier, in particular that of a card, by the known injection molding method. The thermally nonrecrystallizing polyester is thereby melted and pressed into the injection mold so that the card body arises. The latter can be provided, as described above, with printed image data 6 and optionally laser data 3.

Other known injection molding techniques can of course also be applied for producing a card from thermally nonrecrystallizing polyester, in particular molding around leaves of paper or plastic, whereby a leaf of paper or plastic inserted in the injection mold is provided with the transparent, thermally nonrecrystallizing polyester on one or both sides.

Regardless of the production methods outlined, the cards can be processed further by the usual methods. A signature stripe can be applied, an IC module inserted and/or the card embossed by known techniques.

I claim:

1. A single- or multilayer card-shaped data carrier, which has at least one plastic layer, characterized in that the plastic layer comprises a thermally nonrecrystallizing polyester, and the layer contains an antiblocking agent at least in a portion of its volume.

2. The data carrier of claim 1, characterized in that the thermally nonrecrystallizing polyester is a polyethylene terephthalate modified with glycol and CHDM.

3. The data carrier of claim 1, characterized in that the data carrier has two thermally nonrecrystallizing polyester layers, at least one of the two layers being transparent at least in partial areas.

4. The data carrier of claim 1, characterized in that the antiblocklng agent is present in a concentration of 0.1 to 3 wt %.

5. The data carrier of claim 1, characterized in that the partial area in which the antiblocking agent is located extends from the outer surface to at most the middle of the outer layer (5, 12).

6. The data carrier of claim 1, characterized in that the antiblocking agent is selected from the group consisting of paraffins, polyethylene waxes, stearyl alcohols, montanic acids, calcium stearate, zinc stearate, calcium montanate, montanic acid ester wax or partly saponified montanic acid ester wax.

7. The data carrier of claim 1, characterized in that at least one of the chemically modified Layers is transparent, translucent or partly opaque.

8. The data carrier of claim 1, characterized in that at least one of the layers is printed on its inside.

9. The data carrier of claim 1, characterized in that at least one further layer which is opaque is disposed between the two layers.

10. The data carrier of claim 9, characterized in that the further layer consists of paper or plastic and the layer is printed.

11. The data carrier of claim 9, characterized in that the thickness of the further layer is 200 to 650 microns and the thickness of the outer layer 50 to 300 microns.

12. The data carrier of claim 9, characterized in that all layers of the data carrier comprise a chemically modified, thermally nonrecrystallizing polyester.

13. The data carrier of claim 1, characterized in that at least one of the layers contains a radiation-absorbent additive.

14. The data carrier of claim 1, characterized in that the data carrier is a single layer data carrier constructed of only one layer which comprises thermally non-recrystallizing polyester.

15. The data carrier of claim 1, characterized in that the data carrier contains an antiblocking agent at least in a partial area of its volume.

16. The data carrier of claim 1, characterized in that a radiation-absorbent additive was admixed to the material of at least one plastic layer of the data carrier.

17. The data carrier of claim 16, characterized in that a fast and sensitively carbonizing plastic is admixed to the data carrier.

18. The data carrier of claim 1, characterized in that one of the plastic layers contains an additive which is selected from the group consisting of polyethylene naphthalates deriving from polyester.

19. A method for producing the single- or multilayer data carrier of claim 1, characterized in that an antiblocking agent is added to a thermally nonrecrystallizing polyester, this mixture melted and the resulting melt put in card form using the injection molding technique.

20. The method of claim 19, characterized in that further additives, including radiation-absorbent substances, pigments or dyes, are added to the thermally nonrecrystallizing polyester.

21. A method for producing the data carrier of claim 1, characterized in that
  an antiblocking agent is mixed into a thermally nonrecrystallizing polyester,
  a foil is produced from this mixture, the foil being produced in the desired thickness of the data carrier,
  sheets or single cards are produced from the foil,
  the sheets or single cards are printed and, in the case of the sheets, further processed into single cards.

22. The method of claim 20, characterized in that further additives are added to the thermally nonrecrystallizing polyester prior to production of the foil.

23. A method for producing the data carrier of claim 1, characterized in that
  an antiblocking agent is mixed into a thermally nonrecrystallizing polyester,
  a first transparent foil is produced from this mixture, the first foil being laminated with at least one further thermally nonrecrystallizing polyester foil which likewise contains an antiblocking agent.

24. The method of claim 23, characterized in that at least one of the foils is produced by drawing.

25. The method of claim 23, characterized in that at least one of the foils is produced by extrusion.

26. The method of claim 23, characterized in that the first foil is produced by coextruding two thermally nonrecrystallizing PET foils which are subsequently interconnected.

27. The method of claim 26, characterized in that only one of the coextruded foils contains an antiblocking agent.

28. The method of claim 19, characterized in that the antiblocking agent is added to the particular foil material in a quantity of 0.1 to 3 wt %.

29. The method of claim 19, characterized in that a radiation-absorbent substance is added to the foil material additionally.

30. The method of claim 23, characterized in that an opaque core material is laminated between the first foil and the further foil layer.

31. The method of claim 26, characterized in that the core material comprises paper or plastic.

32. The method of claim 26, characterized in that the opaque core material likewise consists of a chemically modified, thermally nonrecrystallizing polyester.

33. The data carrier of claim 1 which is an identity card or bank card.

34. The method of claim 22 wherein the further additives are radiation-absorbent substances, pigments or dyes.

35. A data carrier as claimed in claim 1 wherein the non-recrystallizing polyester is polyethylene terephthalate.

36. The data carrier of claim 4 wherein the antiblocking agent is present in a concentration of from 0.5 to 2 wt %.

37. The data carrier of claim 17 wherein the carbonizing plastic is polycarbonate.

38. The method of claim 28 wherein the anti-blocking agent is present in an amount of from 0.5 to 2 wt %.

39. The data carrier of claim 6 wherein the thermally nonrecrystallizing polyester is a polyethylene terephthalate modified with glycol and CHDM.

* * * * *